(12) United States Patent
Mileski

(10) Patent No.: US 7,886,728 B1
(45) Date of Patent: Feb. 15, 2011

(54) SYSTEM AND METHOD FOR CONTROLLING THE POWER OUTPUT OF AN INTERNAL COMBUSTION ENGINE

(75) Inventor: Paul M. Mileski, Mystic, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 224 days.

(21) Appl. No.: 12/383,086

(22) Filed: Mar. 13, 2009

(51) Int. Cl.
*F02B 47/08* (2006.01)
*F02B 47/00* (2006.01)

(52) U.S. Cl. .............................. 123/568.2; 123/568.12

(58) Field of Classification Search ............. 123/568.2, 123/568.12, 568.17, 568.18, 568.29, 447; 701/108; 60/278, 280, 298, 605.1, 605.2, 60/320
See application file for complete search history.

(56) References Cited

U.S. PATENT DOCUMENTS 3,776,207 A * 12/1973 Simko ........................ 60/278

* cited by examiner

*Primary Examiner*—Mahmoud Gimie
(74) *Attorney, Agent, or Firm*—James M. Kasischke; Michael P. Stanley; Jean-Paul A. Nasser

(57) ABSTRACT

A system and method are provided to control the power output, fuel efficiency and gas emissions of an internal combustion engine using an exhaust gas recirculation system. A recirculation loop containing a heat exchanger and an accumulator is installed between the exhaust ports and intake ports of the cylinders of the internal combustion engine. Diverter valves are used to control the amount of exhaust gas directed into the recirculation loop and the proportion of exhaust gas entering the intake ports. Controlling the amount of re-circulated exhaust gas and proportion of exhaust gas in the intake ports thereby controls the power output of the internal combustion engine.

15 Claims, 1 Drawing Sheet

SYSTEM AND METHOD FOR CONTROLLING THE POWER OUTPUT OF AN INTERNAL COMBUSTION ENGINE

STATEMENT OF GOVERNMENT INTEREST

The invention described herein may be manufactured and used by or for the Government of the United States of America for Governmental purposes without the payment of any royalties thereon or therefor.

CROSS REFERENCE TO OTHER PATENT APPLICATIONS

None.

BACKGROUND OF INVENTION

1) Field of the Invention

The present invention is directed to internal combustion engines and in particular to controlling the power output, increasing the fuel efficiency and reducing the emissions of an internal combustion engine.

2) Description of Prior Art

Conventional systems to control the power output of a spark ignition internal combustion engine restrict the flow of the fuel/air vapor allowed to enter the combustion chamber. These systems result in the maintenance of a substantial vacuum that is a function of engine displacement for a given power output. This vacuum, maintained at a given rate of gas flow, represents wasted energy.

In Asayama (U.S. Pat. No. 4,614,175), a control system is provided to optimize the use of exhaust gas recirculation as part of a conventional emission control system. The focus of this reference is the use of certain sensors to ascertain the operating condition of the engine; thereby, optimizing performance and reducing emissions. In Gartner (U.S. Pat. No. 5,669,365), a method is provided for the reduction of accumulated exhaust particles that tend to clog heat exchangers.

In Kerjean (U.S. Pat. No. 6,250,291), a method is provided for reducing unwanted tailpipe emissions resulting from transient operations of a traditional Exhaust Gas recirculation (EGR) system. The method involves the use of an oxygen sensor and a fuel/air control device that optimizes the mixture of air and fuel delivered to the engine during the transition into/out of EGR. The focus of the cited reference is the ability to extend a low emission operation that is obtained when a properly adjusted engine is operated at a steady-state to the region of operation where the engine load/speed changes due to road requirements. During such time, it is expected that the emission control systems (such as the EGR system) must quickly adjust in order to optimally limit tailpipe emissions.

In Nishada (U.S. Pat. No. 4,727,849), a control system is provided that utilizes an oxygen sensor located such that the proportion of oxygen available in the engine's intake mixture can be ascertained during the operation of a traditional Exhaust Gas Recirculation system. During operation, a small amount (relative to the total atmospheric gas input) of exhaust gas is recirculated into the engine input (what is normally the air/fuel inlet) in order to reduce emission of oxides of nitrogen. The reduction of nitrogen oxide occurs due to the cooling effect such inert gas has upon combustion. Present day automobile engines control the amount of fuel mixed into this input gas based upon the expected effect that recirculated exhaust gas has upon combustion. The reference; thereby, provides a method for sensing the amount of oxygen present within the input gas flow and using this information to optimally improve combustion and tailpipe emissions.

Paas (U.S. Pat. No. 5,785,030) relates to the use of Exhaust Gas Recirculation in diesel engines by providing a method for reducing soot that accumulates upon the surfaces of components such as heat exchangers.

The prior art references do not provide an effective method for improving overall thermal efficiency; reducing the intake vacuum of the internal combustion engine; or effectively using an exhaust gas recirculation system to control engine power output. In regard to the wasted energy, it is desirable to have a system and method of use to control the power output of an engine while avoiding the maintenance of a vacuum and reducing undesirable emissions in the exhaust of an internal combustion engine.

SUMMARY OF THE INVENTION

A system and method of use is provided in accordance with exemplary embodiments of the present invention to utilize the recirculation of exhaust gases in order to control engine power output and to reduce engine emissions.

In one exemplary embodiment, the present invention is directed to control the power output of an internal combustion engine. The system and method of use includes a recirculation loop having an input, an output, a heat exchanger disposed between the input and output and an accumulator disposed between the heat exchanger and the output. An exhaust diverter valve is in communication with the recirculation loop input, atmosphere and an exhaust port of at least one cylinder of the internal combustion engine to divert exhaust gases from the cylinder between the recirculation loop and the atmosphere.

In addition, an intake diverter valve is in communication with the recirculation loop, atmosphere and an intake port of at least one cylinder of the internal combustion engine to control a proportion of exhaust gases to atmospheric gases entering the intake port. The system also includes a control system in communication with the exhaust diverter valve and the intake diverter valve to control power output and emissions output of the internal combustion engine.

In one embodiment, the exhaust diverter valve is in communication with the exhaust ports of all cylinders of the internal combustion engine, and the intake diverter valve is in communication with the intake ports of all cylinders of the internal combustion engine. The system can also include a fuel injector that is disposed between the intake diverter valve and the cylinder intake port and is in communication with the control system. The system can further include an oxygen sensor located between the cylinder exhaust port and the exhaust diverter valve and that is in communication with the control system.

Although the valves can be separate valves, in one embodiment, the exhaust diverter valve and the intake diverter valve constitute a single valve assembly. In one embodiment, the recirculation loop includes passages within the engine block and a cylinder head of the internal combustion engine.

Exemplary embodiments of the present invention are also directed to a method for controlling power output in an internal combustion engine by diverting a portion of an exhaust gas flow from an exhaust port of at least one cylinder of an internal combustion engine into a recirculation loop; cooling the diverted exhaust gas flow through a heat exchanger; passing the diverted gas flow through an accumulator to reduce pressure pulses resulting from a pumping action of the cylinder; controlling a proportion of exhaust gases from the recirculation loop to atmospheric gases allowed to enter an intake port of the internal combustion engine and controlling the diverted portion of exhaust gas flow and the proportion of recirculation loop exhaust gases to atmospheric gases to control power output and emissions output of the internal combustion engine.

In one embodiment, diverting a portion of the exhaust gas flow further includes diverting up to approximately one hundred percent of the exhaust gas flow to the recirculation loop. In addition, controlling the proportion of recirculation loop exhaust gases to atmospheric gases includes controlling the proportion up to approximately one hundred percent recirculation loop exhaust gases in the intake port of the internal combustion engine.

In another embodiment, a single diverter valve is used that is in communication with the recirculation loop, the exhaust port, the intake port and the atmosphere to divert the portion of exhaust gas flow and to control the proportion of recirculation loop exhaust gases to atmospheric gases.

Alternatively, a first diverter valve is used that is in communication with the recirculation loop, the exhaust port and the atmosphere to divert the portion of the exhaust gas flow and using a second diverter valve in communication with the recirculation loop, the intake port and the atmosphere to control the proportion of recirculation loop exhaust gases to atmospheric gases.

In yet another embodiment, a portion of the exhaust gas flow from all cylinders in the internal combustion engine is diverted into the recirculation loop. In still another embodiment, an oxygen sensor disposed adjacent the exhaust port is used to control the quantity of fuel injected through a fuel injector located adjacent the intake port. Existing passages within the internal combustion engine can be used to provide an entire path of the recirculation loop. This path of the recirculation loop includes the heat exchanger and the accumulator.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing wherein like reference numerals and symbols designate identical or corresponding parts throughout the view and wherein.

DETAILED DESCRIPTION OF THE INVENTION

Figure 1:
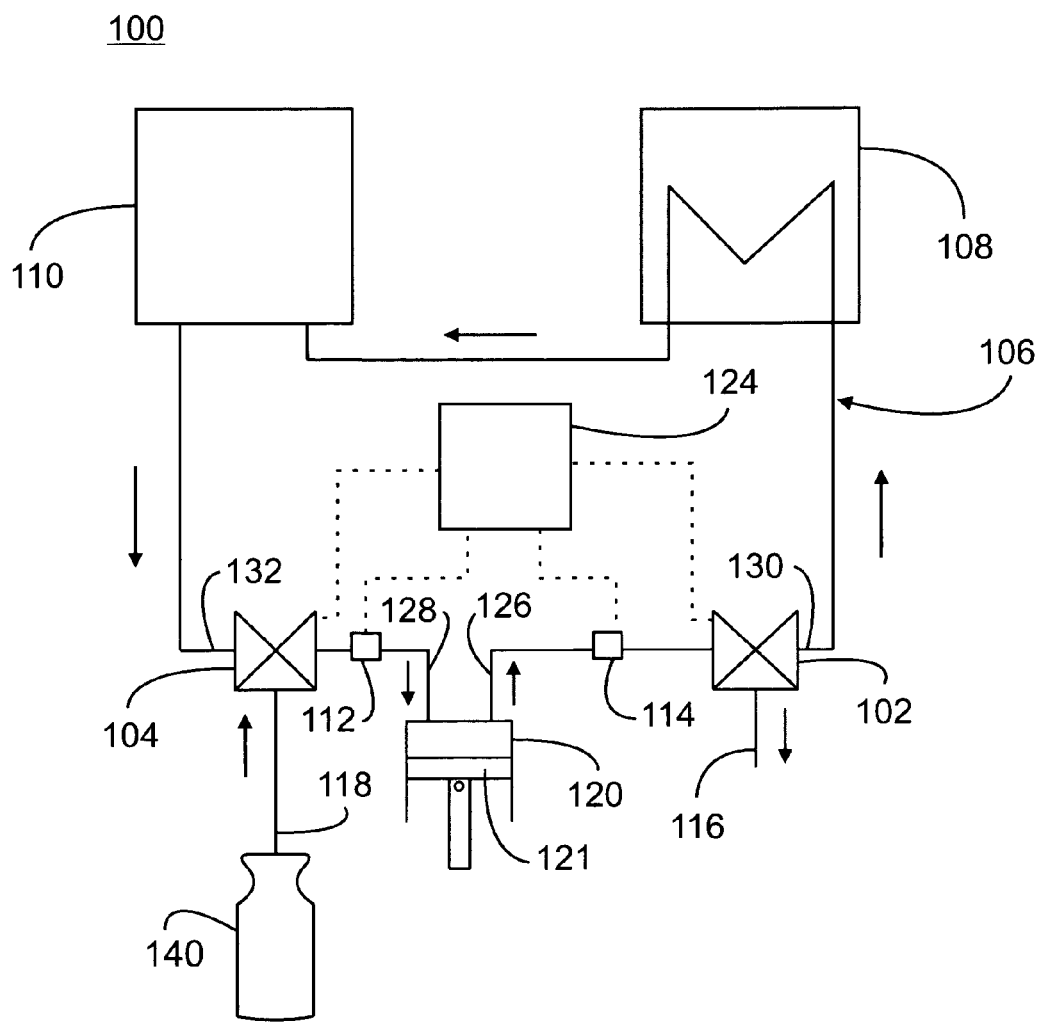
FIG. 1 is a schematic representation of a system for controlling the recirculation of exhaust gases within an internal combustion engine in accordance with the present invention.

Referring now to FIG. 1, an exemplary embodiment of a system 100 is illustrated for controlling the recirculation of exhaust gases within an internal combustion engine to control the power output and emissions of that engine. The system includes a recirculation loop 106 that includes an input end 130 and an output end 132. Exhaust gases that are directed through the recirculation loop 106 flow from the input end 130 to the output end 132 in a direction as indicated by the arrows in the figure.

The recirculation loop 106 also includes a heat exchanger 108 disposed between the input and the output and an accumulator 110 disposed between the heat exchanger and the output end 132. The accumulator 110 acts as a pressure reservoir to smooth the pressure pulses resulting from the pumping action of the piston 121 of an internal combustion engine (not shown). The heat exchanger 108 reduces the temperature of the recycled exhaust gasses.

The system 100 also includes an exhaust diverter valve 102 that is in communication with the recirculation loop 106, the atmosphere 116 and an exhaust port 126 of at least one cylinder 120 of the internal combustion engine. As illustrated, the exhaust diverter valve 102 is a three-way valve that can be used to divert or to direct exhaust gases from the cylinder 120 to either the recirculation loop 106 or the atmosphere 116. The atmosphere 116 represents the atmospheric discharge (e.g. the exhaust manifold) of the internal combustion engine.

The exhaust diverter valve 102 can alternatively be constructed from an arrangement of valves and fittings that achieve the desired diversion and routing of exhaust gases between the atmosphere and the recirculation loop 106. In one embodiment, the exhaust diverter valve 102 is inserted into an existing exhaust port of one or more cylinders of the internal combustion engine.

In the figure, the exhaust diverter valve 102 is in communication with a single cylinder; however, the exhaust diverter valve can be in communication with all of the cylinders in an internal combustion engine containing a plurality of cylinders (e.g., a four, six or eight cylinder engine). For example, the exhaust diverter valve 102 can be attached to the exhaust manifold of the internal combustion engine.

The system 100 also includes an intake diverter valve 104 in communication with the output end 132 of the recirculation loop 106, the atmosphere 116 and an intake port 128 of at least one cylinder 120 of the internal combustion engine. The intake diverter valve 104 is used to control a proportion of exhaust gases to atmospheric gases entering the intake port 128. The atmosphere to which the intake diverter valve 104 communicates includes the carburetor or air induction system of the internal combustion engine.

Suitable valves for the intake diverter valve 104 are the same as for the exhaust diverter valve 102. In one embodiment, the intake diverter valve 104 and the exhaust diverter valve 102 are formed as a single valve assembly in communication with the intake port, the exhaust port, the input end of the recirculation loop 106, the output end of the recirculation loop and the atmosphere 116. In one embodiment, the intake diverter valve 104 is inserted, into an existing intake port of one or more cylinders of the internal combustion engine. The intake diverter valve 104 is illustrated in communication with a single cylinder; however, the intake diverter valve can be in communication with all of the cylinders in an internal combustion engine containing a plurality of cylinders (e.g., a four, six or eight cylinder engine).

The intake diverter valve 104 and the exhaust diverter valve 102 can be positioned so that the recirculation loop 106 operates as a complete or a hundred percent exhaust recirculation loop. In general, the exhaust diverter valve 102 can be positioned to divert up to approximately one hundred percent of the exhaust gases into the recirculation loop 106. Similarly, the intake diverter valve 104 can be positioned to establish a proportion of exhaust gases in the intake port of approximately one hundred percent.

The system 100 also includes a control system 124 in communication with the exhaust diverter valve 102 and the intake diverter valve 104. The exhaust and intake diverter valves would include the necessary electronics to communicate with the control system. Suitable controllable valves and control systems are known and available in the art.

In one embodiment, the control system 124 is a control system separate from the controls of the internal combustion engine. Alternatively, the controls and computer systems of the internal combustion engine are modified to function as the control system of the exhaust recirculation system 100. The control system 124 moves or positions the exhaust and intake diverter valves to control the amount of exhaust gas entering the recirculation loop 106 and the proportion of exhaust gas entering each cylinder intake to control the power output and the emissions output of the internal combustion engine.

The system 100 also includes a fuel injector 112 disposed between the intake diverter valve 104 and the cylinder intake port 128. The fuel injector 112 is in communication with the control system 124. In addition, the system 100 includes an oxygen sensor 114 between the cylinder exhaust port 126 and the exhaust diverter valve 102. The oxygen sensor 114 is also in communication with the control system 124. Suitable fuel injectors and oxygen sensors are known and available in the art.

In one embodiment, the system 100 includes a single oxygen sensor and a plurality of fuel injectors, one for each cylinder. Alternatively, the system 100 includes a plurality of oxygen sensors and a plurality of fuel injectors, one pair for each cylinder in the internal combustion engine.

The exhaust gas of the internal combustion engine contains combustion by-products such as oxygen, oxides of nitrogen, carbon monoxide, soot, hydrocarbons, carbon dioxide and water vapor. This gas, when mixed with the atmospheric air containing principally oxygen and nitrogen, combines with the injected fuel to form the ingredients for combustion. The power output is proportional to the quantity of oxygen and fuel available. The oxygen sensor 114 located at the engine exhaust port is used by the control system 124 in conjunction with the fuel injector 112 to control the quantity of injected fuel at the intake port 128 of the cylinder.

Varying the amount of exhaust gas recirculation controls the power output of the engine. At idle, the recirculation is nearly one hundred percent and decreases to zero at maximum output. At low output power, the pressure within the intake system is only slightly below atmospheric at a value necessary to overcome flow resistance; thereby eliminating the wasted horsepower otherwise required to maintain manifold vacuum. This benefit in reduced manifold vacuum increases as the displacement of the engine increases relative to the same load. Larger internal combustion engines that rarely operate near their output limit will realize the largest benefit.

The present invention significantly reduces the pumping losses required to maintain manifold vacuum; thereby resulting in increased fuel economy. This benefit is the greatest for internal combustion engines that are rarely providing full output.

Recirculation of an approximately 100% proportion of exhaust gases provides the benefit of reducing emissions as well. Unburned hydrocarbons from the previous combustion cycle are recycled and burned. In addition, as with standard exhaust gas recirculation (EGR) systems, the recycled inert gases provide a cooling effect during combustion due to heat absorption; thereby reducing maximum temperatures and reducing the production of oxides of nitrogen.

The present invention significantly reduces the wasted horsepower required to maintain manifold vacuum. This provides for increased compression pressure since each cylinder fills to nearly atmospheric pressure during the intake stroke as opposed to the very low pressure encountered during conventional operation. This increased compression pressure results in increased thermal efficiency. The thermal efficiency is the ratio of heat equivalent work to the heat provided during combustion and has a direct effect upon fuel consumption.

Thermal Efficiency $= 1 - (1/r)^{k-1}$, where "k" is a constant that depends upon the combustion chamber and other considerations, and "r" is the compression ratio. A high thermal efficiency engine loses the majority of the heat of combustion (heat value of the fuel) to pushing the piston 121 downward by the expansion of combustion gases. A low thermal efficiency engine loses most of the heat value of the fuel'to the environment (cooling fluid, exhaust gases).

Exemplary embodiments of the system 100 can be constructed of materials and parts that are independent of the internal combustion engine into which the system is placed. These embodiments would be attached to the appropriate locations and ports of the engine.

Alternatively, the system 100 may utilize passages within the engine structure such as the engine block or cylinder head to provide the entire recirculation path, the accumulator structure, the heat exchanger or combinations thereof. For example, the cylinder head can be used as the accumulator and the coolant system of the internal combustion engine can be used as the heat exchanger. Existing passages in the engine block can be used as the recirculation loop or these passages can be machined into the engine block.

The system of the present invention also provides a method for controlling power output in an internal combustion engine. A portion of the exhaust gas flow from an exhaust port of at least one cylinder of the internal combustion engine is diverted into the recirculation loop 106.

The setup for the method is that the initial state of the exhaust diverter valve 102 is such that the cylinder exhaust port 126 is open to the atmosphere 116 and the input end of the recirculation loop 106 is closed. The initial state of the intake diverter valve 104 is such that the intake diverter valve controls the flow from the atmosphere 116 to the intake port 128. The intake diverter valve 104 is initially set to a pre-determined value to permit proper start-up and initial idling characteristics. The recirculation loop 106 is inactive at this point.

The control system 124 provides a pre-determined signal to the fuel injector 112 to allow proper idling characteristics. The engine is started and allowed to idle for a time sufficient to heat the oxygen sensor 114. The exhaust diverter valve 102 and the intake diverter valve 104 are actuated by the control system 124 which activates the recirculation loop 106. The intake diverter valve 104 is actuated such that the output end of the recirculation loop 106 is open equally to both the intake port 128 and the atmosphere 118.

The exhaust diverter valve 102 is now the principal control for engine output power with the control system 124 performing the following: positioning the exhaust diverter valve as necessary to maintain the desired speed and utilizing the signal from the oxygen sensor 114 to provide the proper pulse width to the fuel injector to maintain the desired air-to-fuel ratio. The shroud 140 at the air intake 118 enables any escaping exhaust gas (due to the pulsating nature of these gases) to mix sufficiently with incoming air to provide a relatively homogeneous mixture of gases to the intake port 128.

Alternatively, a portion of the exhaust gas flow from all cylinders in the internal combustion engine is diverted into the recirculation loop 106. In one embodiment, up to about one hundred percent of the exhaust gas flow is diverted to the recirculation loop 106. The diverted exhaust gas flow is then cooled by passing the gas flow through the heat exchanger 108 within the recirculation loop 106. The diverted and cooled exhaust gas flow is then passed through the accumulator 110 to reduce pressure pulses resulting from a pumping action of the cylinder. In one embodiment, existing passages within the internal combustion engine are used to provide an entire path of the recirculation loop 106, including the heat exchanger 108 and the accumulator 110.

The proportion of exhaust gases from the recirculation loop 106 to atmospheric gases allowed to enter the intake port of the internal combustion engine is also controlled. In one embodiment, the proportion is controlled so that the proportion of recirculated exhaust gases to fresh atmospheric air entering the intake port of the internal combustion engine is up to approximately one hundred percent. The diverted portion of exhaust gas flow and the proportion of recirculation loop exhaust gases to atmospheric gases are controlled to control power output and emissions output of the internal combustion engine.

In one embodiment, a single diverter valve in communication with the recirculation loop 106, the exhaust port, the intake port and the atmosphere is used to divert the portion of exhaust gas flow and to control the proportion of recirculation loop exhaust gases to atmospheric gases. Alternatively, a first diverter valve in communication with the recirculation loop, the exhaust port and the atmosphere is used to divert the portion of the exhaust gas flow, and a second diverter valve in communication with the recirculation loop, the intake port and the atmosphere is used to control the proportion of recirculation loop exhaust gases to atmospheric gases.

In yet another embodiment, an oxygen sensor disposed adjacent the exhaust port controls the quantity of fuel injected through a fuel injector located adjacent the intake port.

In order to provide for a smoother running engine, a shroud 140 can be added to the fresh air intake. The shroud 140 can be a plastic container open at the bottom and fastened at the top of the container to the fresh air intake. The shroud 140 allows the damped exhaust pulses present at a pressure above atmospheric to exit the fresh air intake, mix with fresh air and be sucked together into the fuel injection housing via a ½ inch diameter aluminum tube.

The advantages of the present invention are clear in that the efficiency of an internal combustion engine is improved by the reduction of intake vacuum and by the resultant increase in dynamic compression ratio.

It will be understood that many additional changes in details, materials, steps, and arrangements of parts which have been described herein and illustrated in order to explain the nature of the invention, may be made by those skilled in the art within the principle and scope of the invention as expressed in the appended claims.

What is claimed is:

1. A system for controlling the power output of an internal combustion engine, said system comprising:
   a recirculation loop comprising:
   an input;
   an output;
   a heat exchanger disposed between said input and said output; and
   an accumulator disposed between said heat exchanger and said output;
   an exhaust diverter valve in fluid communication with said recirculation loop input, atmosphere and an exhaust port of at least one cylinder of the internal combustion engine to divert exhaust gases from the cylinder between said recirculation loop and the atmosphere;
   an intake diverter valve in communication with said recirculation loop, atmosphere and an intake port of at least one cylinder of the internal combustion engine to control a proportion of exhaust gases to atmospheric gases entering the intake port; and
   a control system in communication with said exhaust diverter value and said intake diverter valve to control power output and emissions output of the internal combustion engine.

2. The system of claim 1, wherein said exhaust diverter valve is in fluid communication with the exhaust ports of all cylinders of the internal combustion engine and said intake diverter valve is in fluid communication with the intake ports of all cylinders of the internal combustion engine.

3. The system of claim 1, further comprising a fuel injector disposed between said intake diverter valve and the cylinder intake port and in electronic communication with said control system.

4. The system of claim 1, further comprising an oxygen sensor between the cylinder exhaust port and said exhaust diverter valve and in electronic communication with said control system.

5. The system of claim 1, wherein said exhaust diverter valve and said intake diverter valve comprise a single valve assembly.

6. A method for controlling power output in an internal combustion engine, said method comprising:
   diverting a portion of an exhaust gas flow from an exhaust port of at least one cylinder of an internal combustion engine into a recirculation loop;
   cooling the diverted exhaust gas flow through a heat exchanger;
   passing the diverted gas flow through an accumulator to reduce pressure pulses resulting from a pumping action of the cylinder;
   controlling a proportion of exhaust gases from the recirculation loop to atmospheric gases allowed to enter an intake port of the internal combustion engine; and
   controlling the diverted portion of exhaust gas flow and the proportion of recirculation loop exhaust gases to atmospheric gases to control power output and emissions output of the internal combustion engine.

7. The method of claim 6, wherein said step of diverting a portion of the exhaust gas flow further comprises diverting up to approximately 100% of the exhaust gas flow to the recirculation loop.

8. The method of claim 6, wherein said step of controlling the proportion of recirculation loop exhaust gases to atmospheric gases further comprises controlling the proportion up to approximately 100% recirculation loop exhaust gases in the intake port of the internal combustion engine.

9. The method of claim 6, said method further comprising using a single diverter valve in communication with the recirculation loop, the exhaust port, the intake port and the atmosphere to divert the portion of exhaust gas flow and to control the proportion of recirculation loop exhaust gases to atmospheric gases.

10. The method of claim 6, said method further comprising using a first diverter valve in communication with the recirculation loop, the exhaust port and the atmosphere to divert the portion of the exhaust gas flow and using a second diverter valve in communication with the recirculation loop, the intake port and the atmosphere to control the proportion of recirculation loop exhaust gases to atmospheric gases.

11. The method of claim 6, wherein said step of diverting a portion of the exhaust gas flow into the recirculation port further comprises diverting a portion of the exhaust gas flow from all cylinders in the internal combustion engine.

12. The method of claim 6, said method further comprising using an oxygen sensor disposed adjacent the exhaust port to control the quantity of fuel injected through a fuel injector located adjacent the intake port.

13. The method of claim 6, said method further comprising using existing passages within the internal combustion engine to provide an entire path of the recirculation loop.

14. The method of claim 13, wherein a path of the recirculation loop comprises the heat exchanger and the accumulator.

15. A method for controlling power output in an internal combustion engine, said method comprising:
supplying atmospheric air to an intake port of an internal combustion engine through an intake diverter valve fluidly connected to the intake port;
providing a pre-determined signal to a fuel injector to allow an idling mode of the engine wherein the fuel injector is fluidly connected to the engine;
diverting exhaust gas with an exhaust diverter valve fluidly connected to an exhaust port of the engine wherein a portion of the exhaust gas flow from the exhaust port exhausts to the atmosphere;
idling the engine to level recognized by oxygen sensor;
controlling the exhaust diverter valve and the intake diverter valve to activate a recirculation loop with exhaust gases from the engine wherein the recirculation loop is fluidly connected to the valves and the engine;
cooling exhaust gases with a heat exchanger fluidly connected within the recirculation loop;
controlling the intake diverter valve such that an output end of the recirculation loop is equally open to the intake port of the engine and the atmosphere;
controlling a proportion of exhaust gases with the exhaust diverter valve to enter the intake port of the engine by the path of the recirculation loop and the intake diverter valve to maintain a desired air-to-fuel ratio for engine output.

* * * * *